(12) United States Patent
Gergely et al.

(10) Patent No.: US 10,744,718 B2
(45) Date of Patent: Aug. 18, 2020

(54) AMALGAMATION JOINING METHODS AND APPARATUSES

(71) Applicant: GM GLOBAL TECHNOLOGY OPERATIONS LLC, Detroit, MI (US)

(72) Inventors: Ryan Gergely, Fraser, MI (US); Matthew Simonin, Ortonville, MI (US); Kevin Stang, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 15/704,591

(22) Filed: Sep. 14, 2017

(65) Prior Publication Data

US 2019/0077087 A1 Mar. 14, 2019

(51) Int. Cl.
*B32B 37/00* (2006.01)
*B29C 65/08* (2006.01)
(Continued)

(52) U.S. Cl.
CPC .............. *B29C 65/08* (2013.01); *B29C 65/32* (2013.01); *B29C 65/3448* (2013.01); *B29C 65/3476* (2013.01); *B29C 65/3604* (2013.01); *B29C 65/3648* (2013.01); *B29C 65/3668* (2013.01); *B29C 65/3676* (2013.01); *B29C 65/44* (2013.01); *B29C 65/46* (2013.01); *B29C 65/524* (2013.01); *B29C 65/562* (2013.01); *B29C 65/564* (2013.01); *B29C 65/609* (2013.01); *B29C 65/64* (2013.01); *B29C 65/645* (2013.01); *B29C 65/7826* (2013.01); *B29C 66/1122* (2013.01); *B29C 66/21* (2013.01); *B29C 66/30321* (2013.01); *B29C 66/30325* (2013.01); *B29C 66/30341* (2013.01); *B29C 66/472* (2013.01); *B29C 66/474* (2013.01);
(Continued)

(58) Field of Classification Search
USPC ....................................................... 156/73.1
See application file for complete search history.

(56) References Cited

U.S. PATENT DOCUMENTS

| 3,874,963 A | 4/1975 | Barger |
| 2008/0206012 A1* | 8/2008 | Vas ..................... B29C 66/1122 411/171 |

(Continued)

FOREIGN PATENT DOCUMENTS

DE 3437974 A1 4/1986

*Primary Examiner* — James D Sells
(74) *Attorney, Agent, or Firm* — Quinn IP Law (57) ABSTRACT

A method or apparatus for joining a first component to a second component with an amalgamation plate includes heating the first component, the second component, the amalgamation plate, or combinations thereof, with either a joining tool or a heating element. The components are attached to the amalgamation plate with the joining tool, such that the first component, amalgamation plate, and the second component are fixedly attached to one another, and the amalgamation plate may be substantially surrounded by the first component and the second component, such that it is hidden from exposure. Portions of the amalgamation plate may be embedded into the components via rotation and/or linear force. A portion of the amalgamation plate may be recessed within the joining tool or an anvil before attaching the amalgamation plate to the either component.

20 Claims, 5 Drawing Sheets

(51) Int. Cl.
| | |
|---|---|
| *B29C 65/00* | (2006.01) |
| *B29C 65/32* | (2006.01) |
| *B29C 65/36* | (2006.01) |
| *B29C 65/46* | (2006.01) |
| *B29C 65/56* | (2006.01) |
| *B29C 65/64* | (2006.01) |
| *B29C 65/78* | (2006.01) |
| *B29C 65/34* | (2006.01) |
| *B29C 65/52* | (2006.01) |
| *B29C 65/44* | (2006.01) |
| *B29C 65/60* | (2006.01) |
| *B29C 65/48* | (2006.01) |
| *B29C 65/18* | (2006.01) |
| *B29C 65/14* | (2006.01) |
| *B29C 70/72* | (2006.01) |
| *F16B 15/00* | (2006.01) |
| *F16B 11/00* | (2006.01) |

(52) U.S. Cl.
CPC .......... *B29C 66/54* (2013.01); *B29C 66/7392* (2013.01); *B29C 66/73921* (2013.01); *B29C 66/742* (2013.01); *B29C 66/81* (2013.01); *B29C 66/81431* (2013.01); *B29C 66/8322* (2013.01); *B29C 66/83411* (2013.01); *B29C 65/1432* (2013.01); *B29C 65/18* (2013.01); *B29C 65/48* (2013.01); *B29C 66/022* (2013.01); *B29C 66/026* (2013.01); *B29C 66/02245* (2013.01); *B29C 66/721* (2013.01); *B29C 66/7422* (2013.01); *B29C 66/74283* (2013.01); *B29C 70/72* (2013.01); *F16B 11/006* (2013.01); *F16B 2015/0069* (2013.01)

(56) References Cited

U.S. PATENT DOCUMENTS

| | | |
|---|---|---|
| 2013/0287481 A1 | 10/2013 | Hardy |
| 2015/0041070 A1* | 2/2015 | Wang .................. B29C 65/4815 156/580 |
| 2015/0099093 A1 | 4/2015 | Arbesman et al. |

\* cited by examiner

AMALGAMATION JOINING METHODS AND APPARATUSES

INTRODUCTION

This disclosure generally relates to structures, apparatuses, and methods for amalgamation joining, such as that used to join thermoplastics or composites. Particularly, amalgamation joining may be used with reinforced components.

SUMMARY

A method or apparatus for joining a first component to a second component with an amalgamation plate is provided. The method or apparatus includes heating the first component, the second component, the amalgamation plate, or combinations thereof, with one of a joining tool and a heating element, and attaching the amalgamation plate to the first component with the joining tool.

The second component is attached to the amalgamation plate with the joining tool, such that the first component, amalgamation plate, and the second component are fixedly attached to one another. In many configurations, the amalgamation plate is substantially surrounded by the first component and the second component, such that it is hidden from view and environmental exposure.

The amalgamation plate, or portions thereof, may be embedded into the components via rotation, linear force, or combinations thereof. The method or apparatus may include flipping the first component and the amalgamation plate, relative to the joining tool. A portion of the amalgamation plate may be recessed within the joining tool or within an anvil before attaching the amalgamation plate to the first component.

The apparatus may heat the components or the amalgamation plate via ultrasonic heating, induction heating, or resistance heating. Furthermore, there may be a plurality of amalgamation plates with connecting strips therebetween, such that the amalgamation plates are attached to the components in a continuous process.

The apparatus or method may include melting a portion of one of the components, such that material from the component flows through portion of the amalgamation plate and solidifies to hold the amalgamation plate relative to the component. An adhesive may be applied between the first component and the second component, and may be in contact with the amalgamation plate.

The above features and advantages, and other features and advantages, of the present subject matter are readily apparent from the following detailed description of some of the best modes and other configurations for carrying out the disclosed structures, methods, or both.

DETAILED DESCRIPTION

Figure 1:
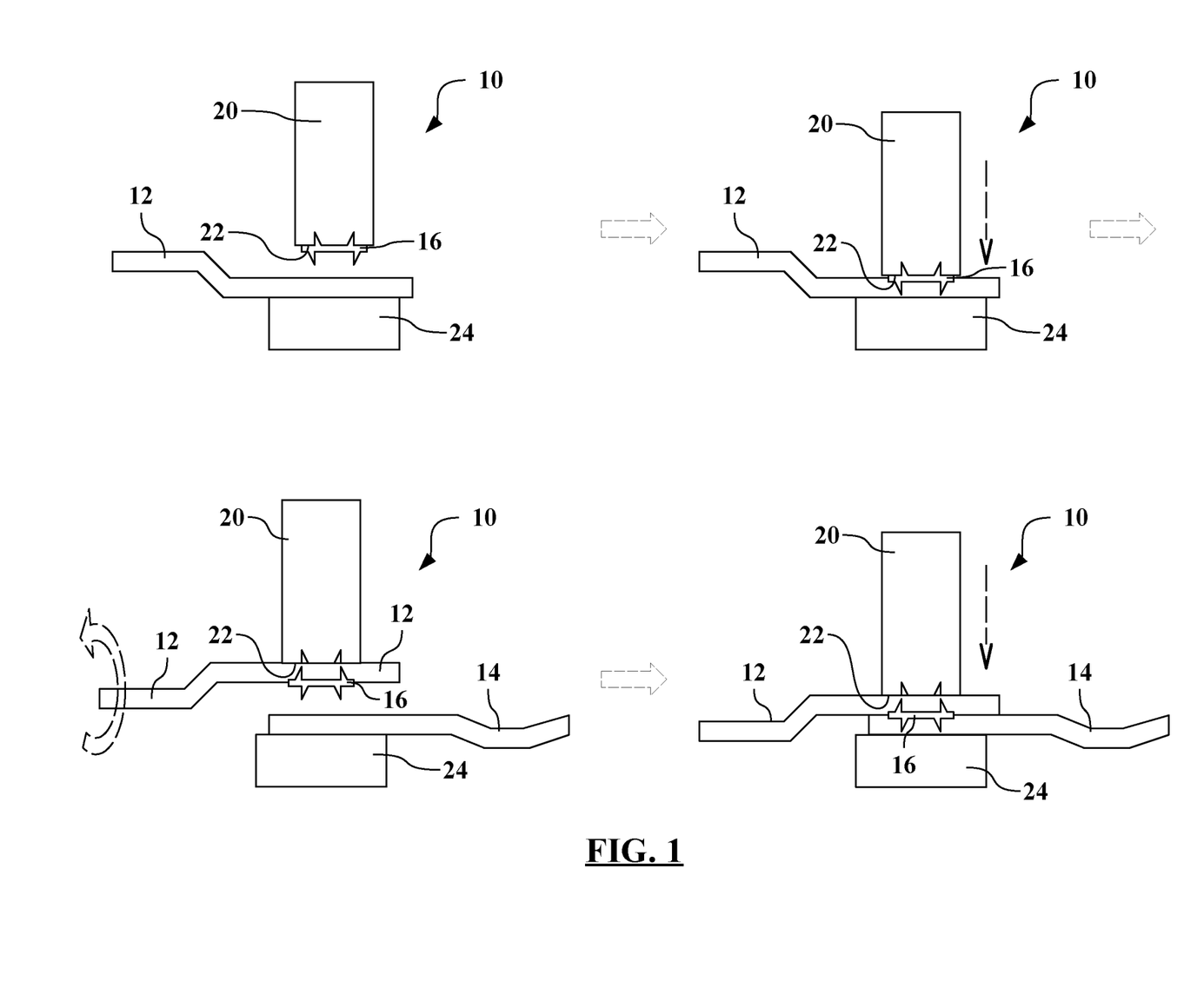
FIG. 1 is a schematic diagram of the progression of an apparatus or system for joining multiple plastic, composite, or thermoplastic components with an amalgamation plate via a two-stage, spot or batch, process.

In the drawings, like reference numbers correspond to like or similar components whenever possible throughout the several figures. There is shown in FIG. 1 a schematic diagram of an apparatus 10 progressively implementing a method of joining a first component 12 to a second component 14. The apparatus 10 uses an amalgamation plate 16 to join the first component 12 to the second component 14, which may also be referred to as substrates.

The first component 12 and the second component 14 may be formed from, in very general terms, plastics or composites, and may be compression molded or injection molded to a final component shape. Joining the first component 12 and the second component 14 may result in a part that is used as, for example and without limitation, a body panel or a structural component. Note that the shapes of the first component 12 and the second component 14—and of all other components illustrated herein—are diagrammatically shown solely to illustrate general features of the apparatus 10. The shapes, sizes, or configurations shown are not limiting in any way.

More specifically, the first component 12 and the second component 14 (and additional components) may be formed from a thermoplastic polymer, a composite, or combinations thereof. Thermoplastics may be softened or melted repeatedly through heating, and then resolidified upon cooling.

This heating and solidification process is reversible, as opposed to thermoset plastics, where the material remains solid upon heating up to a point of degradation, beyond which it cannot resolidify.

The thermoplastic polymers or composites forming the first component 12 and the second component 14 could be of, for example and without limitation: a commodity type (such as polypropylene), or an engineering type (such as nylon). The first component 12 and the second component 14 may also be filled with reinforcements or enhancements to alter or improve mechanical properties.

Filler concentrations can be as low as a few percent for injection molding plastics, or up to around seventy percent for high performance composites. Common types of filler are, without limitation, glass and carbon, both of which could be in the form of powders or fibers. When the filler is a powder or short fiber (having a length on the order of a few hundred microns), filled thermoplastic polymers are still, generally, referred to as plastics. As the fiber length becomes longer the materials may be referred to as polymer composites.

The fibers in polymer composites may be classified as short, long, or continuous. Short and long fiber composites contain discontinuous fibers on the order of a millimeter in length, for short fibers, and up to several millimeters or centimeters, for long fibers. Continuous fibers can be oriented in the same direction in a sheet, or woven and braided in differing orientations. Sheets of continuous fibers may be laminated in various directions, which affects the material properties of the composite.

As the fiber length of the first component 12 and the second component 14 becomes longer, and fiber concentration becomes higher, the mechanical properties generally increase. Processing of thermoplastic polymers and composites may range from injection molding for shorter fiber lengths, and lower filler concentrations, to compression molding or thermoforming and stamping for longer fiber lengths and higher filler concentrations. Thus, the apparatus 10 may be used to join first components 12 and second components 14 formed from a wide variety of plastic and composite materials, with varying material properties, processing conditions, and ultimate applications.

The structures shown in the figures are basic illustrations to assist in description of the methods, apparatuses, and structures characterized herein. Skilled artisans will recognize that additional tools, components, and equipment may be used to implement the techniques described herein.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or of the description.

As used herein, the term "substantially" refers to relationships that are, ideally perfect or complete, but where manufacturing realties prevent absolute perfection. Therefore, substantially denotes typical variance from perfection. For example, if height A is substantially equal to height B, it would be preferred that the two heights are 100.0% equivalent, but manufacturing realities likely result in the distances varying from such perfection. Skilled artisans would recognize the amount of acceptable variance.

Additionally, coverages, areas, or distances may generally be within 10% of perfection for substantial equivalence. Similarly, relative alignments, such as parallel or perpendicular, may generally be considered to be within 5%. Note, however, that those having ordinary skill in the relevant arts would understand acceptable variances from perfection.

The apparatus 10 heats either, or both, the first component 12 and the amalgamation plate 16. In the configuration of the apparatus 10 in FIG. 1, a joining tool 20 is also the heating apparatus. Note, however, that a separate, dedicated, heater or heating apparatus may be used in lieu of using the joining tool 20 as the heater, as also described herein.

After heating, the apparatus 10 is configured to attach the amalgamation plate 16 to the first component 12 with the joining tool 20. In this configuration, the joining tool 20 provides linear force to push the amalgamation plate 16 into the first component 12. The amalgamation plate 16 may be formed from different materials, including, without limitation: steel, aluminum, or polymer. In most configurations, the amalgamation plate 16 may have a higher melting point than the material of either the first component 12 or the second component 14.

A face 22 of the joining tool 20 drives the amalgamation plate 16 into the first component 12. As schematically illustrated, the face 22 may include cavities to allow portions of the amalgamation plate 16, such as protrusions, to be embedded within the face 22.

An anvil 24 provides reactive force between the first component 12 with the joining tool 20. The anvil 24 may be representative of any structure providing reactive force, such as a conveyer belt or other structure that also moves the first component 12 relative to the joining tool 20.

In some configurations of the apparatus 10, the amalgamation plate 16 may be initially held by the anvil 24, as opposed to the joining tool 20. Therefore, a portion of the amalgamation plate 16 may be recessed within the anvil 24, such that it may have similar features to those on the face 22 of the joining tool 20. The amalgamation plate 16 may be disposed on the opposite side of the first component 12 relative to the joining tool 20 before attaching the amalgamation plate 16 to the first component 12. This configuration may also result in the apparatus 10 flipping the first component 12 and the amalgamation plate 16 before attaching the second component 14. Additionally, a heater may be located near, or incorporated into, the anvil 24, such that heat is applied to the second component 14 by the anvil 24.

The apparatus 10 is also configured to attach the second component 14 to the amalgamation plate 16 with the joining tool 20, such that the first component 12, amalgamation plate 16, and the second component 14 are fixedly attached to one another. The face 22 of the joining tool 20 drives the amalgamation plate 16 into the second component 14. In many configurations, the joining tool 20 (or other heating apparatus) will also heat the second component 14 or the amalgamation plate 16 with the joining tool 20 before attaching the second component 14 to the amalgamation plate 16.

Heating melts, or at least softens, the material of the first component 12 and the second component 14 before embedding the amalgamation plate 16 therein. Heating may provide different attachment characteristics than, for example, driving a fastener through the first component 12 or the second component 14, and may allow portions of the amalgamation plate 16 to penetrate the first component 12 or the second component 14 without altering adjoining structure.

Although the view of FIG. 1 is schematic, in many configurations, the apparatus 10 will embed the amalgamation plate 16 such that it is completely, or substantially, surrounded by the first component 12 and the second component 14. Therefore, the amalgamation plate 16 is hidden from view and from environmental exposure. The combined part formed from attachment of the first component 12 to the second component 14 is larger than either of the first component 12 or the second component 14, such that it may be used for purposes or functions that neither the first component 12 nor the second component 14 could have fulfilled.

As shown in FIG. 1, the apparatus 10 may flip the first component 12 and the amalgamation plate 16, relative to the joining tool 20, after attaching the amalgamation plate 16 to the first component 12. This allows reorientation of the part relative to joining tool 20 before attaching the second component 14 to the amalgamation plate 16, and allows the joining tool 20 to act in the same direction for both attachment procedures. Other configurations of the apparatus 10 may not flip the first component 12 and the amalgamation plate 16, such that the joining tool 20 drives the second component 14 into the amalgamation plate 16.

In many configurations of the apparatus 10, the joining tool 20 will also heat the second component 14 before attaching the second component 14 to the amalgamation plate 16. Alternatively, a dedicated heater may be used to heat the second component 14, the amalgamation plate 16, or both.

In order to heat the first component 12, the second component 14, the amalgamation plate 16, or combinations thereof, the joining tool 20 may be configured to produce heat in various ways. For example, the joining tool 20 may include resistance heating elements, such that the joining tool 20 is heated and conductively transfers that heat to the amalgamation plate 16, or such that the joining tool 20 applies a current through the amalgamation plate 16 and directly heats the amalgamation plate 16 via resistance.

Additionally, the apparatus 10 may be configured such that the joining tool 20 is an ultrasonic horn. Therefore, the joining tool 20 is configured to heat the amalgamation plate 16 and/or the first component 12, and also the amalgamation plate 16 and/or the second component 14, via ultrasonic heating. Incorporating an ultrasonic horn into the joining tool 20 provides relatively quick heating, allowing the material of the first component 12 or the second component 14 to melt during attachment to the amalgamation plate 16.

While FIG. 1 may illustrate the apparatus 10 as generally within the same facility, and as operating in a single process, the steps shown may be executed at different times or at different facilities. For example, one or more amalgamation plates 16 may be attached to the first component 12 at one facility, and then shipped to a different facility to be combined with the second component 14 for the finished part, or parts. This may be the case, for example, in situations where the first component 12 and the second component 14 are formed from different materials.

Furthermore, alternative configurations may use multiple joining tools 20. For example, because the joining tool 20 shown includes features on the face 22 to allow the protrusions of the amalgamation plate 16 to be recessed therewithin, the apparatus 10 may use a joining tool that does not include the recessed cavities to attach the second component 14.

Figure 2A:
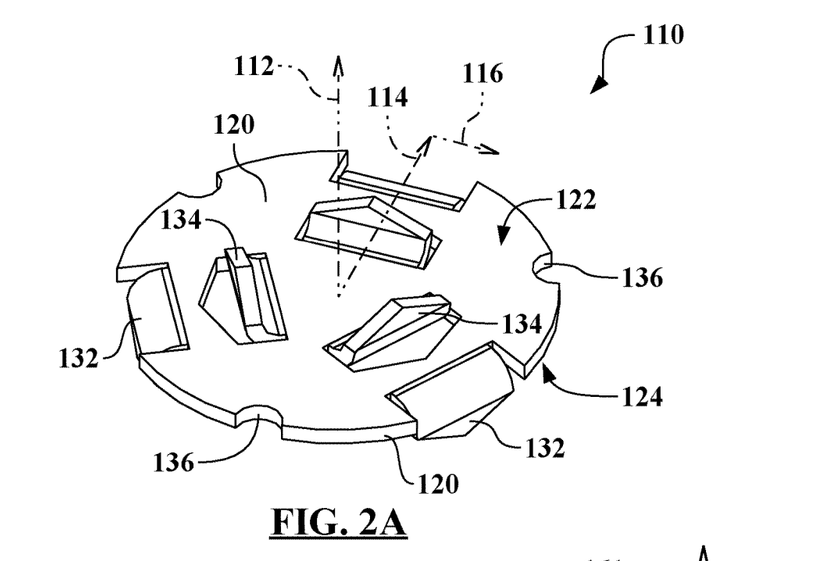
FIG. 2A is a schematic isometric view of an amalgamation plate, which may be used with the apparatus of FIG. 1 or similar systems, showing axial spikes or protrusions extending from a planar, radial body.
Figure 2B:
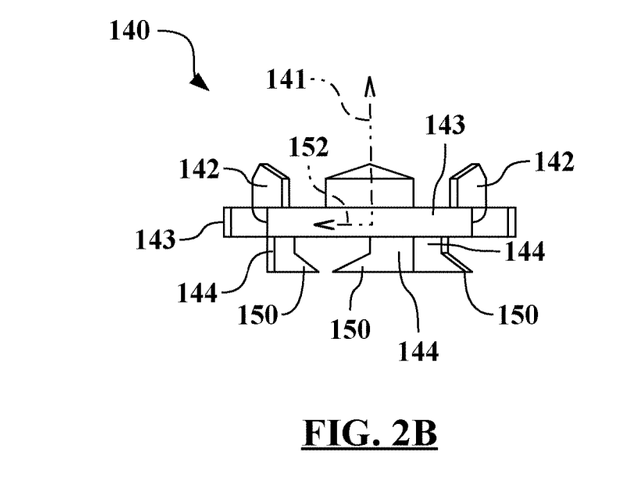
FIG. 2B is a schematic side view of another amalgamation plate, which may be used with the apparatus of FIG. 1 or similar systems, showing axial spikes or protrusions having angular features that may be rotatably affixed.
Figure 2C:
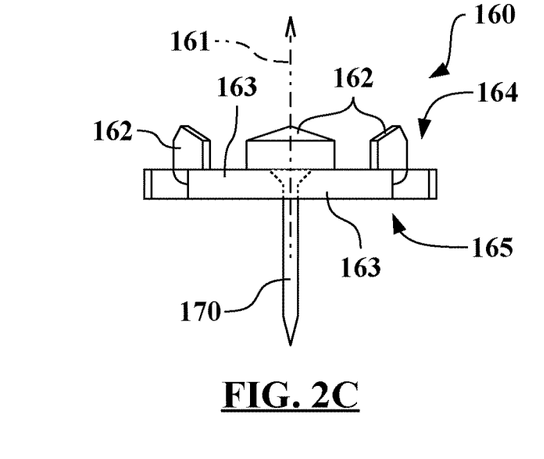
FIG. 2C is a schematic side view of another amalgamation plate, which may be used with the apparatus of FIG. 1 or similar systems, showing axial spikes or protrusions extending from one side of a planar, radial body and a fastener extending from another side of the radial body.

Referring also to FIGS. 2A, 2B, and 2C, and with continued reference to FIG. 1, there are shown more-detailed views of amalgamation plates, which may be used as the amalgamation plate 16 within the apparatus 10 of FIG. 1. Further referring to FIGS. 3A, 3B, 3C, and 3D, there are shown schematic top views of amalgamation plates as two-dimensional blanks prior to stamping into three-dimensional plates, such has those shown in FIGS. 2A, 2B, and 2C.

Figure 3A:
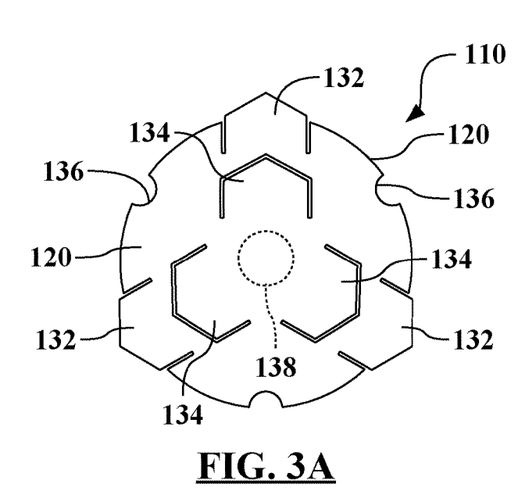
FIG. 3A is a schematic top view illustrating formation of the three-dimensional amalgamation plate shown in FIG. 2A from a two-dimensional blank, and further illustrating the axial protrusion shapes.
Figure 3B:
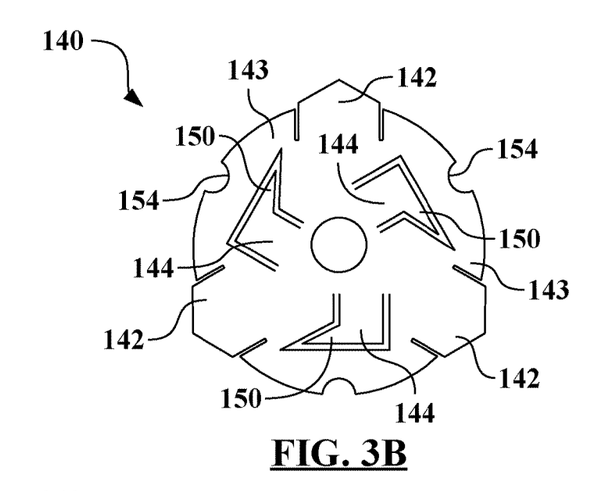
FIG. 3B is a schematic top view of another amalgamation plate, which may be similar to that shown in FIG. 2B, illustrating angular protrusions on a two-dimensional blank.
Figure 3C:
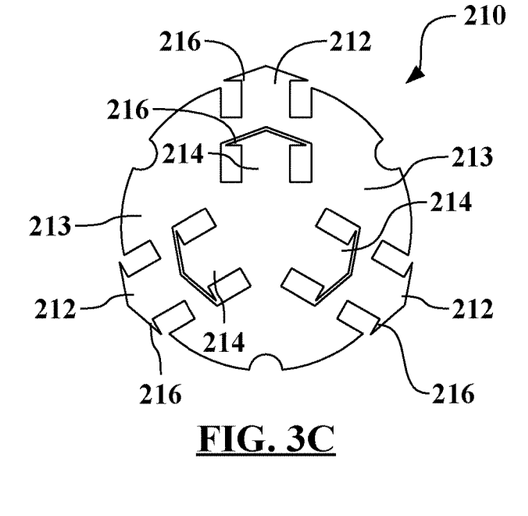
FIG. 3C is a schematic top view of another amalgamation plate, which may be used with the apparatus of FIG. 1 or similar systems, illustrating axial or angular protrusion shapes on a two-dimensional blank.
Figure 3D:
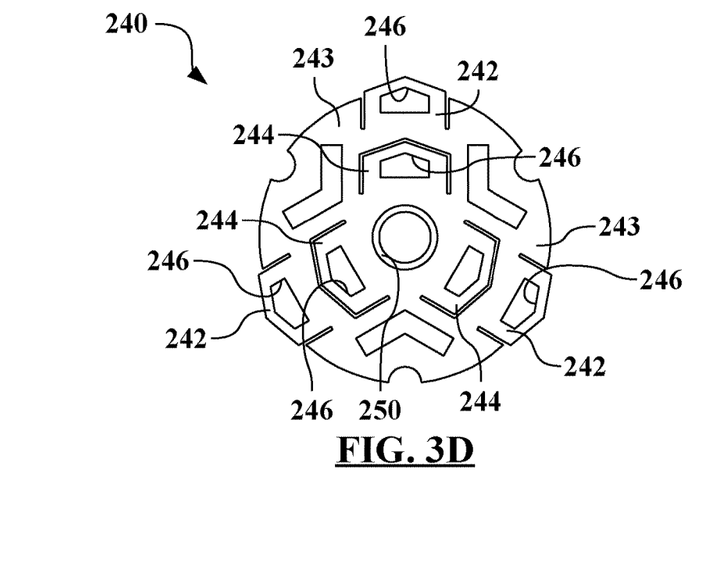
FIG. 3D is a schematic top view of another amalgamation plate, which may be used with the apparatus of FIG. 1 or similar systems, illustrating additional, axial protrusion shapes on a two-dimensional blank.

FIG. 2A shows an isometric view of an amalgamation plate 110, while FIG. 2B and FIG. 2C show side views of, respectively, a rotationally-driven amalgamation plate 140 and a fastener-type amalgamation plate 160. FIG. 3A shows a top view of the amalgamation plate 110 of FIG. 2A as a two-dimensional blank, and FIG. 3B shows a top view of the amalgamation plate 140 of FIG. 2B as a two-dimensional blank. FIG. 3C and FIG. 3D show top views of an amalgamation plate 210 and an amalgamation plate 240, both as two-dimensional blanks.

The different configurations of amalgamation plates shown in FIGS. 2A-3D, and elsewhere, are not limiting. The configurations of amalgamation plates herein are illustrative of only some of the possible features of amalgamation plates usable with the apparatuses and methods described herein. Furthermore, skilled artisans will recognize variations of the shapes and features of the amalgamation plates described herein.

Referring generally to FIGS. 2A and 3A, FIG. 2A shows the amalgamation plate 110, which may be used to join the first component 12 to the second component 14 illustrated in FIG. 1, or other components. The amalgamation plate 110 has an axis 112 substantially at its center.

The axis 112 defines an axial direction substantially coincident therewith. A radial direction 114 is defined as extending outward from the axis 112. Furthermore, an angular direction 116 is defined as substantially perpendicular to the radial direction 114. The angular direction 116 may also be referred to as a tangential direction or as the azimuth about the axis 112 (in cylindrical coordinate definitions).

A planar body 120 of the amalgamation plate 110 is configured to be placed between components, such as the first component 12 and the second component 14 shown in FIG. 1. The planar body 120 has a first side 122 and a second side 124, which is substantially opposite the first side 122.

A plurality of first penetrating features or first protrusions 132 extend from the first side 122 of the planar body 120 and are radially dispersed from, or about, the axis 112 of the amalgamation plate 110. The first protrusions 132 are configured to be embedded within one of the components.

In the amalgamation plate 110 shown, a plurality of second penetrating features or second protrusions 134 extend from the second side 124, opposite the first protrusions 132. The second protrusions 134 are radially dispersed from the axis 112, and the second protrusions 134 are configured to be embedded within another component, such as the second component 14. Embedding the first protrusions 132 and the second protrusions 134 occurs via application of force substantially along, or parallel to, the axis 112, such as by the joining tool 20.

FIG. 3A shows the first protrusions 132 and the second protrusions 134 on the two-dimensional blank version of the amalgamation plate 110. The first protrusions 132 are radially inward relative to the second protrusions 134. As shown by comparison between FIGS. 3A and 3B, the amalgamation plate 110 may be formed by stamping the two-dimensional blank from flat stock, and then folding the first protrusions 132 and the second protrusions 134 outward (in opposing directions) from the planar body 120 toward, or substantially parallel with, the axis 112.

Although the components being joined are not viewable in FIG. 2A or FIG. 3A, the amalgamation plate 110 is configured to be completely, or substantially, hidden by the components to which it is attached. For example, if the amalgamation plate 110 is used to join the first component 12 to the second component 14 shown in FIG. 1, the amalgamation plate 110 would be hidden from view and neither the first protrusions 132 nor the second protrusions 134 protrude through the respective components. In addition to aesthetic benefits provided by hiding the amalgamation plate 110, it is also protected from environmental exposure and may be less likely to corrode.

As shown in FIG. 2A, the first protrusions 132 and the second protrusions 134 of the amalgamation plate 110 are radially, and angularly, symmetric about the axis 112. Rotating the amalgamation plate 110 by 120-degrees results in identical orientations. Other configurations may have radial alignments symmetric at 90-degrees or may have inner and outer protrusions that are not aligned with each other.

In spite of the symmetry shown in FIGS. 2A and 3A, it may still be beneficial to angularly align, or clock, the amalgamation plate 110 about the axis 112. Therefore, the amalgamation plate 110 includes a plurality of alignment features 136 formed at an exterior edge of the planar body 120.

The alignment features 136 are configured to angularly locate the planar body 120, the first protrusions 132, and the second protrusions 134 about the axis 112 and to the joining tool (such as the joining tool 20). For example, and without limitation, the components joined by the amalgamation plate 110 may be more likely to separate in a specific direction, such that the first protrusions 132 and the second protrusions 134 may be oriented specifically to mitigate against that direction of separation. The joining tool, such as the joining tool 20, may include features, such as pegs, extending from the face to interface with the alignment features 136.

If the joining tool includes pegs to interface with the alignment features 136, it may be beneficial to use one joining tool for initial attachment of the amalgamation plate 110 to the first component and then a second joining tool for attachment of the amalgamation plate 110 to the second component. Note that pegs on the joining tool may also be used to rotate the amalgamation plate 110 as it is being embedded within the first component—as described in more detail relative to other configurations.

As shown in FIG. 3A, the amalgamation plate 110 may include an optional axial-alignment hole 138 formed through the planar body 120. The axial-alignment hole 138 aligns the amalgamation plate 110 about relative to the axis 112, but does not angularly align the first protrusions 132 and the second protrusions 134. Essentially the axial-alignment hole 138 centers the amalgamation plate 110 about the axis 112, but allows amalgamation plate 110 (if the alignment features 136 were not interacting with the joining tool) to rotate relative to the axis 112.

The amalgamation plate 110, or a plurality thereof, may be the only feature joining the components, or the amalgamation plate 110 may work in concert with an adhesive. The amalgamation plate 110, or a plurality thereof, may be used to help define or control the thickness of the adhesive between the components.

Therefore, the surfaces of the amalgamation plate 110 may be treated to limit unwanted chemical reactivity with the adhesive, or to promote beneficial chemical reactivity with the adhesive. Additionally, as the amalgamation plate 110 may be encapsulated by the components to which it is attached, the amalgamation plate 110 may be treated to limit unwanted chemical reactivity with the material of the components.

Additionally, the amalgamation plate 110 may be treated to promote adhesion or grip between the amalgamation plate 110 and the components to which it is attached. Therefore, the surfaces of the planar body 120—including those on the first side 122, the second side 124, the first protrusions 132, and the second protrusions 134—may have a chemical treatment applied thereto to increase adhesion of the amalgamation plate 110 to the first component 12 and the second component 14. Additionally, or alternatively, the surfaces of the planar body 120, including those on both the first side 122 and the second side 124, the first protrusions 132, and the second protrusions 134, may have a mechanical treatment applied thereto to increase adhesion of the amalgamation plate 110 to the first component 12 and the second component 14. Exemplary mechanical treatments include, without limitation, sand blasting or other abrasion.

FIG. 2B and FIG. 3B show a schematic side view and top view, respectively, of the amalgamation plate 140. Like the amalgamation plate 110 of FIG. 2A, the amalgamation plate 140 is symmetric about an axis 141, although the symmetry may be difficult to view in FIG. 2B.

A plurality of first protrusions 142 extend from a planar body 143, and are radially spaced relative to the axis 141. The amalgamation plate 140 further includes a plurality of second protrusions 144, extending opposite the first protrusions 142.

Unlike the first protrusions 142, which are aligned along the axis 141, the second protrusions 144 have angular projections 150 that extend in an angular direction 152. Therefore, the second protrusions 144 are configured to be embedded within a component via rotation about the axis 141—as contrasted with, or in addition to, linear force along the axis 141.

As best viewed in FIG. 3B, the angular projections 150 extend from the remainder of the second protrusions 144 in the angular direction 152. Rotation of the amalgamation plate 140 will embed the angular projections 150 into the component, such as the first component 12 or the second component 14, such that the amalgamation plate 140 provides opposition to separation from the component via pull force along the axis 141, in addition to shear force perpendicular to the axis.

The amalgamation plate 140 also includes a plurality of alignment features 154 formed at an exterior edge of the planar body 143. The alignment features 154 are configured to angularly locate and orient the amalgamation plate 140 about the axis 141. Furthermore, the alignment features 154 may interact with the joining tool to assist in rotationally-driving the amalgamation plate 140, and the angular projections 150, into one of the components.

FIG. 2C shows a schematic side view of the amalgamation plate 160, which is symmetric about an axis 161. Similar to the other configurations, a plurality of first protrusions 162 extend from a planar body 163.

The first protrusions 162 extend from a first side 164 of the planar body 163. However, unlike the other configurations shown herein, the amalgamation plate 160 does not include second protrusions extending from a second side 165 of the planar body 163.

Instead, a fastener 170 is attached to the planar body 163 and extends away from the second side 165, opposite the first protrusions 162. The fastener 170 may be, for example, and without limitation: a screw, a self-piercing rivet, a pin-and-collar rivet, a bolt, or a blind rivet. The first protrusions 162 are configured to be attached to a component, such as either the first component 12 or the second component 14 via force substantially parallel to the axis 161. The fastener 170 is configured to be attached to the other component via rotation about the axis 161 and or application of force substantially parallel to the axis 161. The fastener 170 may be incorporated into the amalgamation plate 160, or may be a separate piece that passes through or is subsequently attached to the amalgamation plate 160.

Note that alternative configurations may have the fastener 170 and the first protrusions 162 extending from the same side of the planar body 163. For example, the first protrusions 162 may be driven into one side of the first component 12. The second component 14 may be placed opposite the amalgamation plate 160, relative to the first component 12, and the fastener 170 driven through both the first component 12 and the second component 14 to create attachment therebetween. Note that many configurations using the fastener 170 may not result in joining of the first component 12 to the second component 14 via completely hidden structures, as either the amalgamation plate 160, the fastener 170, or both, may be viewable from one side of the assembled part.

FIGS. 3C and 3D show two-dimensional blank versions of amalgamation plate configurations. FIG. 3C shows a schematic top view of the amalgamation plate 210 as a two-dimensional blank. The amalgamation plate 210 is symmetric about an axis, which is substantially perpendicular to the viewpoint of FIG. 3C.

A plurality of first protrusions 212 extend from a planar body 213, and are radially spaced relative to the axis. The amalgamation plate 210 further includes a plurality of second protrusions 214, extending opposite the first protrusions 212.

The first protrusions 212 and the second protrusions 214 include hooking features 216 that extend in an angular direction. The first protrusions 212 and the second protrusions 214 are configured to be embedded within a component via linear force along the axis.

After the material of either of the components solidifies, the hooking features 216 provide positive resistance—as opposed to simply providing drag or frictional resistance—substantially parallel to the axis. Therefore, the amalgamation plate 210 opposes separation from the component via pull force along the axis.

Additionally, during the process of embedding the first protrusions 212 or the second protrusions 214 prong features into the components, the first protrusions 212 or the second protrusions 214 may reorient, such that they are no longer aligned with the axis of the plate of the amalgamation plate 210. This reorientation may provide additional resistance to pull out, and may be controlled by the embedding process.

FIG. 3D shows a schematic top view of the amalgamation plate 240 as a two-dimensional blank. The amalgamation plate 240 is symmetric about an axis, which is substantially perpendicular to the viewpoint of FIG. 3D.

A plurality of first protrusions 242 extend from a planar body 243, and are radially spaced relative to the axis. The amalgamation plate 240 further includes a plurality of second protrusions 244, extending opposite the first protrusions 242.

Unlike some of the other configurations, the amalgamation plate 240 includes a number of different staking, or heat-staking, features designed to create positive locking with the components, such as the first component 12 and the second component 14 of FIG. 1, to which the amalgamation plate 240 is attached. The first protrusions 242 and the second protrusions 244 include staking features 246 that allow melted material to flow radially through the first protrusions 242 and the second protrusions 244 after being driven into the heated components. The staking features 246, therefore, oppose separation from the component via pull force along the axis—similar to the hooking features 216 of the amalgamation plate 210 shown in FIG. 3C.

Additionally, the amalgamation plate 240 includes a center staking hole or a tapered hole 250, which acts to stake the planar body 143 to one of the components. For example, as the amalgamation plate 240 is embedded within a first component, melted material from the first component flows upward through the tapered hole 250 and radially outward along the taper. When the material resolidifies within the tapered hole 250, there is a positive restraint force parallel to the axis, as the material has latched beyond the taper. The tapered hole 250 may also be beneficial for alignment of the amalgamation plate 240 relative to the joining tool. Note that a similar tapered hole is shown schematically in FIG. 7.

Referring now to FIGS. 4-7, and with continued reference to FIGS. 1-3D, there are shown additional schematic diagrams of apparatuses or systems for joining multiple plastic components. The apparatuses shown in the figures may be used with the amalgamation plates illustrated in FIG. 2A-3D, or with similarly functioning joining structures.

Figure 4:
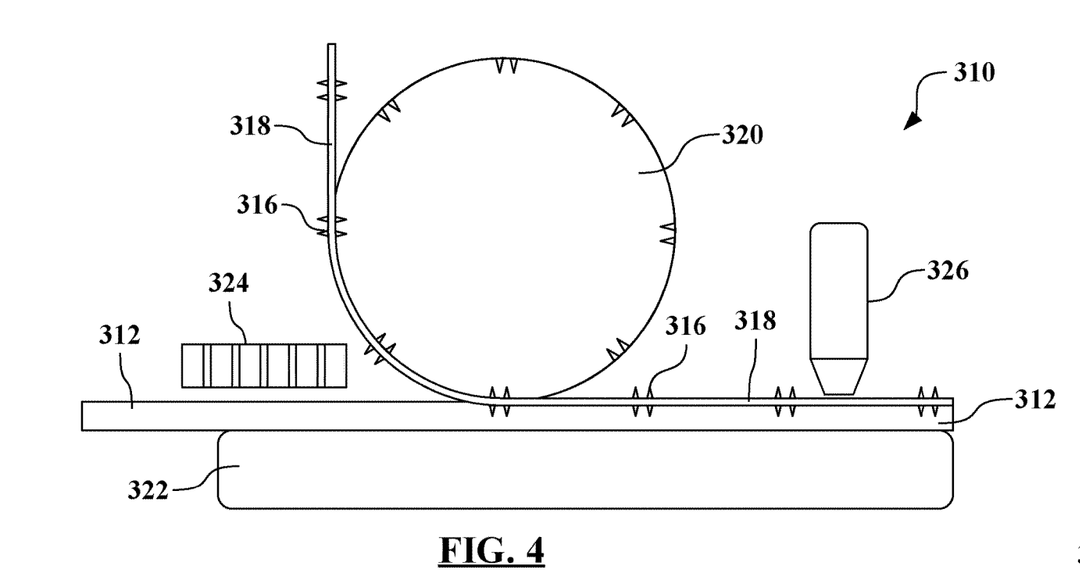
FIG. 4 is a schematic diagram of another apparatus or system for joining multiple plastic or composite components with one or more amalgamation plates via a continuous process.

FIG. 4 is a schematic diagram of an apparatus 310 for joining components, such as a first component 312 with one or more amalgamation plates 316. In the configuration shown, a plurality of amalgamation plates 316 are joined by carrier strips 318. As shown, a joining tool 320 continuously attaches the amalgamation plates 316 to the first component 312.

Unlike some of the other configurations, the amalgamation plates 316 shown in FIG. 4 are connected by the carrier strips 318. These amalgamation plates 316 may be stored as a coil or reel (not shown) that is feed to the apparatus 310. Additionally, unlike some of the other configurations, the joining tool 320 is a roller and opposed to a linear press. Therefore, the joining tool 320 is continuously attaching a plurality of amalgamation plates 316 to the first component 312, and the force is being reacted by an anvil 322.

Although not shown, a second component may then be attached to the amalgamation plates 316 via a similar process (roller) or via a spot process. For example, portions of the joined first component 312 and amalgamation plates 316 may be cut or separated, and then attached to an individual second component via a linear joiner tool, such as the joining tool 20 shown in FIG. 1.

In the apparatus 310 shown, a portion of the amalgamation plates 316 is recessed within the joining tool 320 before attaching the amalgamation plates 316 to the first component 312. Recession within the joining tool 320 may help align the amalgamation plates 316 relative to the first component 312 and may help with application of pressure by the joining tool 320 on the amalgamation plates 316.

A heater or heating apparatus 324 applies heat to the first component 312, the amalgamation plates 316, or both. Therefore, embedding protrusions of the amalgamation plates 316 within the first component 312 may be improved, particularly if the resulting heat is sufficient to melt the material of the first component 312. Alternatively, the joining tool 320 may be a heater, or may be heated, such that the joining tool 320 heats the amalgamation plates 316 as they are moved to the first component 312.

In the configuration shown, the heating apparatus 324 is an induction heater, which heats substantially only the first component 312. However, the heating apparatus 324 may also be, for example without limitation: an ultrasonic heater or a radiant heater. Furthermore, because the carrier strips 318 connect the amalgamation plates 316, the apparatus 310 may utilize resistance heating to heat the amalgamation plates 316.

A spreader 326 applies an adhesive between the first component 312 and the, subsequent, second component. In this configuration, the adhesive is applied after the amalgamation plates 316 are embedded within the first component 312. However, other configurations may place the spreader 326 before (relative to the left-to-right direction of work flow) the amalgamation plates 316 are joined. Generally, the adhesive will spread around the amalgamation plates 316 and through the carrier strips 318, such that adhesion occurs between the first component 312, the amalgamation plates 316, and the second component.

Figure 5:
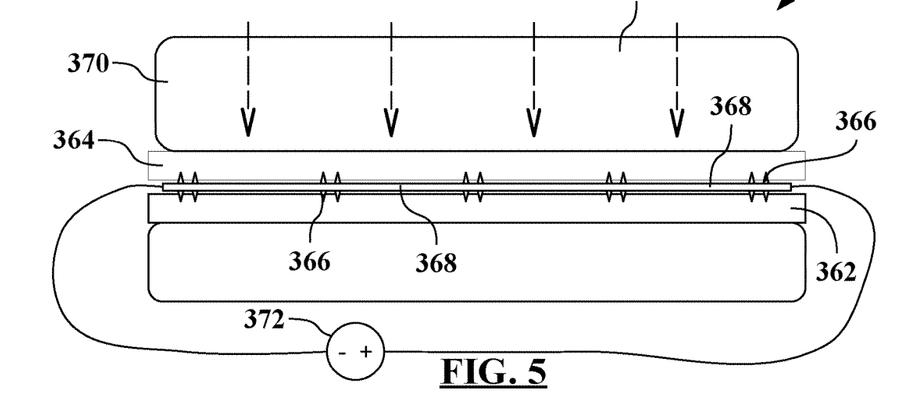
FIG. 5 is a schematic diagram of another apparatus or system for joining multiple composite or plastic components with a plurality of amalgamation plates via a spot or batch process.

FIG. 5 is a schematic diagram of an apparatus 360 for joining a first component 362 to a second component 364 with a plurality of amalgamation plates 366 via a spot or batch process. The apparatus 360 uses amalgamation plates 366 that are connected via carrier strips 368, but does so with a batch, or spot, process, as opposed to a continuous process.

The apparatus 360 heats the amalgamation plates 366 before embedding portions of the amalgamation plates 366 into the first component 362 with a joining tool 370. In the configuration shown, the apparatus 360 heats the amalgamation plates 366 via resistance heating from a voltage supply 372 (and leads connecting the same to the amalgamation plates 366). Because the amalgamation plates 366 are heated via resistance, it may be possible to embed the amalgamation plates 366 within the first component 362 and the second component 364 substantially simultaneously, as illustrated.

FIG. 5 shows the amalgamation plates 366 partially embedded within the first component 362 and the second component 364, as the joining tool 370 is applying linear pressure thereto. After fully embedding the amalgamation plates 366, the first component 362 and the second component 364 may surround the amalgamation plates 366, such that they are hidden from view and from environmental exposure.

Figure 6:
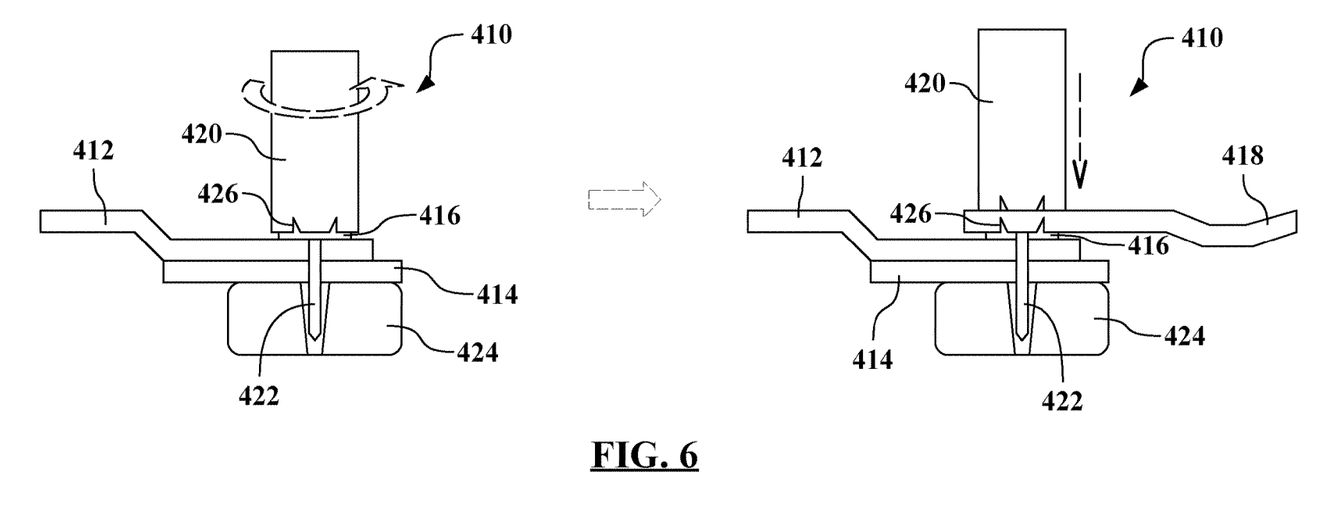
FIG. 6 is a schematic diagram of another apparatus or system for joining multiple plastic or composite components with an amalgamation plate, having a fastener incorporated therewith, via a spot or batch process.

FIG. 6 is a schematic diagram of an apparatus 410 for joining multiple plastic components. In the configuration shown, a first component 412 and a second component 414 are initially joined to an amalgamation plate 416, and then a third component 418 is joined thereto.

A joining tool 420 is configured to rotationally drive the amalgamation plate 416, which includes a fastener 422 extending from one side thereof. In the configuration shown, the fastener 422 is driven through both the first component 412 and the second component 414 against the support of an anvil 424.

The fastener 422 may be attached to the planar body of the amalgamation plate 416, which acts as a washer. Alternatively, the fastener 422 may be incorporated as one-piece with the amalgamation plate 416 or may be integrated, such as via over-molding.

In some configurations of the apparatus 410, the joining tool 420 may also heat the fastener 422, the first component 412, the second component 414, or combinations thereof, such as through ultrasonic heating. However, in many configurations, the fastener 422 will be configured to pierce one or both of the first component 412 and the second component 414 without the aid of heat or the need to melt the materials thereof.

The amalgamation plate 416 also includes a plurality of protrusions 426 extending from the opposite side from the fastener 422. The amalgamation plate 416 may be similar to the fastener-type amalgamation plate 160 shown in FIG. 2C. The protrusions 426 are recessed within the joining tool 420, which may provide the interface needed to apply torque to the amalgamation plate 416 and rotationally drive it into the components.

The third component 418 may then be attached to the protrusions 426 of the amalgamation plate 416 via linear force applied by the joining tool 420. Note that the joining tool 420 is configured for both linear and rotational driving. Additionally, the joining tool 420 may be configured to heat the third component 418, such as by ultrasonic heating, or to heat the amalgamation plate 416, such as by induction heating, before embedding the protrusions 426 within the third component 418.

Referring also to FIG. 2B, the apparatus 410 and, in particular, the joining tool 420 may also be used to attach rotational-type fasteners to components, such as the amalgamation plate 140 of FIG. 2B. For example, using some of the elements shown in FIG. 6 for illustration, the amalgamation plate 140 may be attached to the first component 412 and then to the third component 418.

Initially, the first protrusions 142 of the amalgamation plate 140 may be recessed within the joining tool 420 (similar to the orientation of the protrusions 426 of the amalgamation plate 416). Heat may be applied to the first component 412 by the joining tool 420, or by a dedicated heater.

Rotation of the joining tool 420, along with linear advancement, will cause the second protrusions 144 of the amalgamation plate 140 to embed within the first component 412. In particular, the angular projections 150 would, following resolidification of the material, be locked within the first component 412.

Then the third component 418 may be overlaid onto the first component 412 and the amalgamation plate 140. The joining tool 420 may apply heat to the third component 418, the amalgamation plate 140, or both, and then the joining tool 420 may drive the first protrusions 142 of the amalgamation plate 140 into the third component 418.

Figure 7:
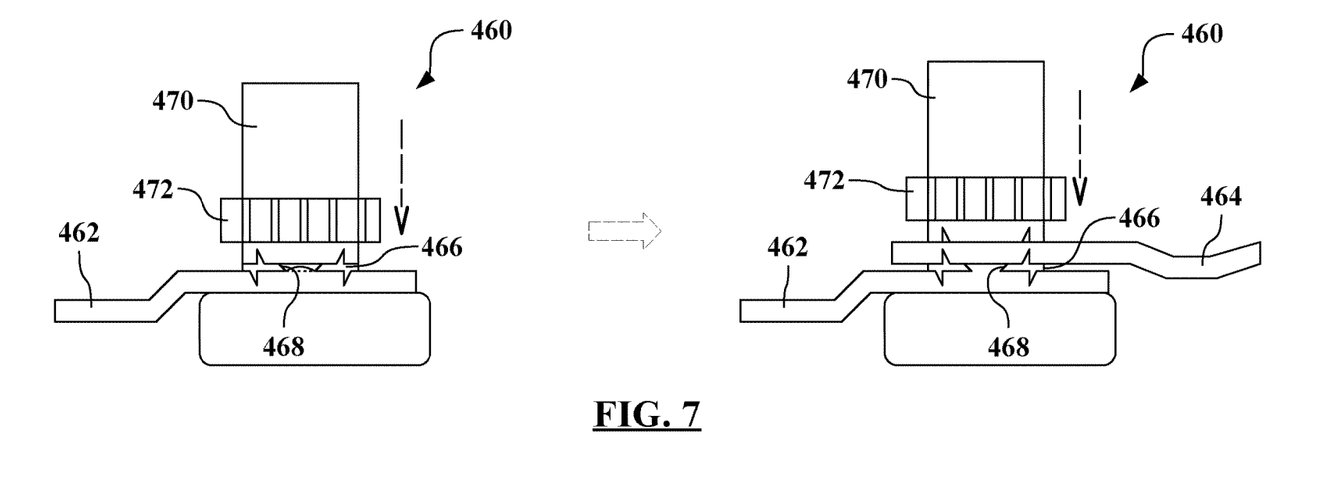
FIG. 7 is a schematic diagram of another apparatus or system for joining multiple composite or plastic components with an amalgamation plate via a spot or batch process, illustrating heat staking of the amalgamation plate to one or more of the components.

FIG. 7 is a schematic diagram of an apparatus 460 for joining a first component 462 and a second component 464 with an amalgamation plate 466, via a spot or batch process. As shown in FIG. 7, the apparatus 460 includes heat staking the amalgamation plate 466 to, at least, the first component 462.

The center of the amalgamation plate 466 includes a tapered hole 468—similar to the tapered hole 250 of the amalgamation plate 240 shown in FIG. 3D. A joining tool 470 applies heat and pressure to the amalgamation plate 466. Heating may be incorporated into the joining tool 470, such as an ultrasonic horn, or may be from a dedicated heater 472, as shown in FIG. 7. The heater 472 may be, for example and without limitation, an induction heater.

As the joining tool 470 applies pressure and the heater 472 applies heat, the material of the first component 462 melts, which allows a portion of the material to flow through the tapered hole 468 of the amalgamation plate 466. This is illustrated in the first progression (on the left) of FIG. 7.

As the material moves through the tapered hole 468, the face of the joining tool 470 will restrain further movement.

After heat and pressure are removed from the first component 462, the material within the tapered hole 468 will solidify. At this point, there is a positive restraint between the material of the first component 462 and the amalgamation plate 466, as some of that material has moved radially and axially over portions of the tapered hole 468. This is illustrated in the second progression (on the right) of FIG. 7.

Additionally, the face of the joining tool 470 may be used to contour or shape the melted material staking the first component 462 to the amalgamation plate 466. Therefore, the joining tool 470 may affect the shape and type of staking bond created when the material solidifies.

The second component 464 may then be aligned with the opposing side of the amalgamation plate 466. Note that, in addition to the protrusions, the amalgamation plate 466 is restrained from movement by the heat staking within the tapered hole 468. The amalgamation plate 466, the second component 464, or both, are then heated and linear force applied, such that portions of the amalgamation plate 466 are embedded within the second component 464. Note that because the joining tool 470 includes cavities on its face, a different joining tool may be used to join the amalgamation plate and the second component 464.

The detailed description and the drawings or figures are supportive and descriptive of the subject matter discussed herein. While some of the best modes and other embodiments have been described in detail, various alternative designs, embodiments, and configurations exist.

The invention claimed is:

1. A method of joining a first component to a second component with an amalgamation plate, comprising:
   heating one of the first component and the amalgamation plate with one of a joining tool and a heating element;
   attaching the amalgamation plate to the first component with the joining tool by embedding a plurality of first protrusions extending from the amalgamation plate into the first component; and
   attaching the second component to the amalgamation plate with the joining tool by embedding a plurality of second protrusions extending from the amalgamation plate into the second component, such that the first component, the amalgamation plate, and the second component are fixedly attached to one another, and
   wherein the amalgamation plate is substantially surrounded by the first component and the second component, such that the amalgamation plate is hidden from view and environmental exposure, and the first protrusions and second protrusions are not melted within the first component and the second component.

2. The method of claim 1, further comprising:
   flipping the first component and the amalgamation plate, relative to the joining tool, after attaching the amalgamation plate to the first component and before attaching the second component to the amalgamation plate.

3. The method of claim 1, wherein a portion of the amalgamation plate is recessed within the joining tool before attaching the amalgamation plate to the first component.

4. The method of claim 3, wherein the joining tool heats the one of the first component and the amalgamation plate via ultrasonic heating.

5. The method of claim 3, wherein heating the one of the first component and the amalgamation plate occurs via induction heating.

6. The method of claim 3, wherein heating the one of the first component and the amalgamation plate occurs via resistance heating.

7. The method of claim 6,
   wherein the amalgamation plate is a plurality of amalgamation plates with connecting strips therebetween,
   wherein the plurality of amalgamation plates are attached to the first component in a continuous process, and
   wherein the plurality of amalgamation plates are attached to the second component in a continuous process.

8. The method of claim 1, wherein a portion of the amalgamation plate is recessed within an anvil on a side of the first component that is opposite from the joining tool before attaching the amalgamation plate to the first component.

9. The method of claim 1, further comprising:
   melting a portion of the first component with the joining tool, such that material from the first component flows through a portion of the amalgamation plate and solidifies to hold the amalgamation plate relative to the first component.

10. A method of joining a first component to a second component with an amalgamation plate, comprising:
    heating the amalgamation plate;
    embedding a plurality of first protrusions extending from the amalgamation plate into the first component with a joining tool, such that the first component is fixedly attached to the amalgamation plate; and
    embedding a plurality of second protrusions extending from the amalgamation plate into the second component with the joining tool, such that the first component, the amalgamation plate, and the second component are fixedly attached to one another, and wherein the amalgamation plate is substantially surrounded by the first component and the second component, such that the amalgamation plate is hidden from view and environmental exposure.

11. The method of claim 10, wherein heating the amalgamation plate occurs via resistance heating.

12. The method of claim 11, wherein the amalgamation plate is a plurality of amalgamation plates, which are heated via resistance heating.

13. The method of claim 10, wherein a portion of the amalgamation plate is recessed within the joining tool before attaching the amalgamation plate to the first component.

14. The method of claim 10, wherein a portion of the amalgamation plate is recessed within an anvil on a side of the first component that is opposite from the joining tool before attaching the amalgamation plate to the first component.

15. The method of claim 10, further comprising:
    melting a portion of the first component with the joining tool, such that material from the first component flows through a portion of the amalgamation plate and solidifies to hold the amalgamation plate relative to the first component.

16. The method of claim 10, further comprising:
    melting a portion of the first component with the joining tool, such that material from the first component flows through staking features formed in the first protrusions of the amalgamation plate and solidifies within the staking features to hold the amalgamation plate relative to the first component.

17. A method of joining a first component to a second component with an amalgamation plate, comprising:
    heating one of the first component and the amalgamation plate with one of a joining tool and a heating element, wherein the amalgamation plate is a plurality of amalgamation plates with connecting strips therebetween;

attaching the amalgamation plate to the first component with the joining tool, wherein the plurality of amalgamation plates are attached to the first component in a continuous process; and attaching the second component to the amalgamation plate with the joining tool, such that the first component, the amalgamation plate, and the second component are fixedly attached to one another, and wherein the amalgamation plate is substantially surrounded by the first component and the second component, such that the amalgamation plate is hidden from view and environmental exposure, wherein the plurality of amalgamation plates are attached to the second component in a continuous process.

18. The method of claim 17, wherein a portion of the amalgamation plate is recessed within the joining tool before attaching the amalgamation plate to the first component.

19. The method of claim 17, wherein a portion of the amalgamation plate is recessed within an anvil on a side of the first component that is opposite from the joining tool before attaching the amalgamation plate to the first component.

20. The method of claim 17, further comprising:
melting a portion of the first component with the joining tool, such that material from the first component flows through staking features formed in the first protrusions of the amalgamation plate and solidifies within the staking features to hold the amalgamation plate relative to the first component.

* * * * *